No. 756,360. Patented April 5, 1904.

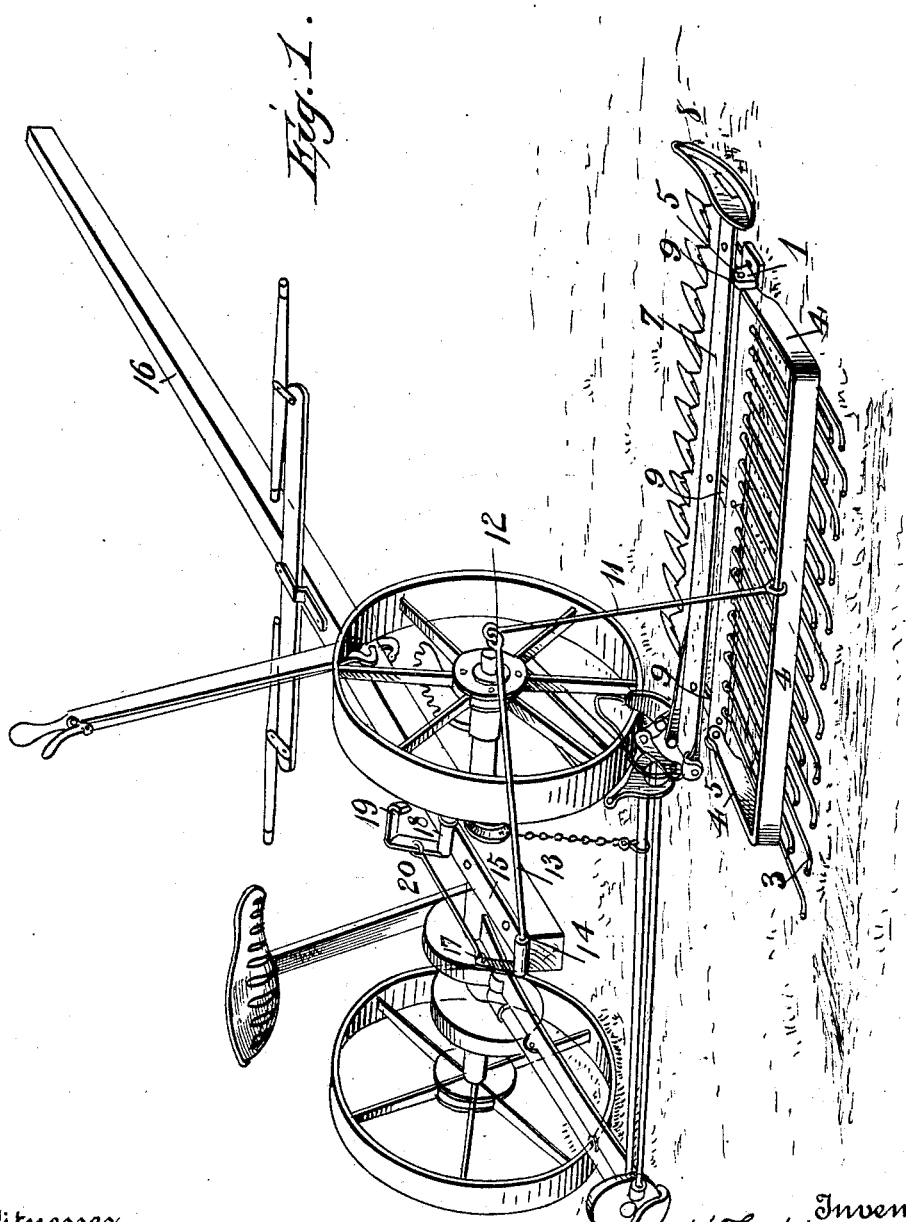

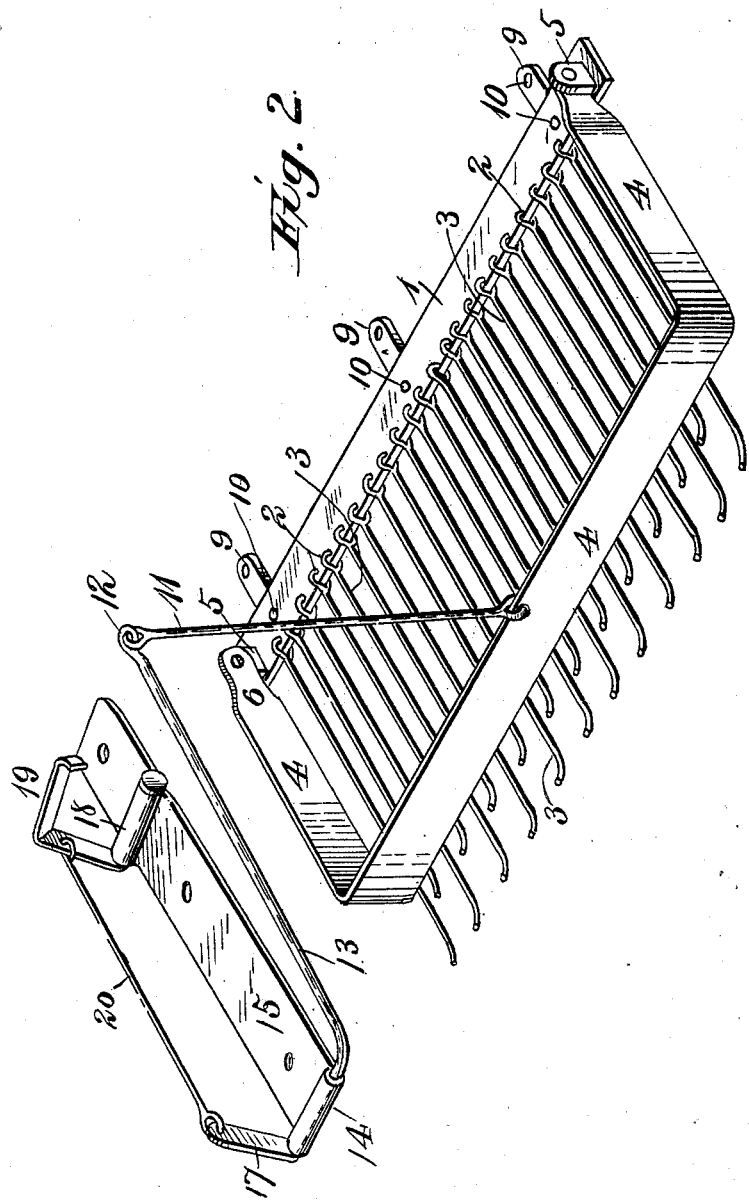

UNITED STATES PATENT OFFICE.

HARFORD F. HARRAH AND WILLIAM S. FLINT, OF PENDLETON, OREGON.

MOWING-MACHINE ATTACHMENT.

SPECIFICATION forming part of Letters Patent No. 756,360, dated April 5, 1904.

Application filed August 21, 1903. Serial No. 170,288. (No model.)

*To all whom it may concern:*

Be it known that we, HARFORD F. HARRAH and WILLIAM S. FLINT, residing at Pendleton, in the county of Umatilla and State of Oregon, have invented certain new and useful Improvements in Mowing-Machine Attachments; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention is an attachment to mowing-machines, and is intended as a buncher or windrowing device—that is, it is intended to collect the hay into bunches or windrows.

In the accompanying drawings, Figure 1 is a perspective view of our invention attached to a mowing-machine. Fig. 2 is a perspective view of our invention detached.

Our invention is described as follows:

Referring to the drawings, 1 represents an iron bar, flat or otherwise, with perforations 2 through its rear edge, and in said perforations are hinged or otherwise attached rods or slats 3, made loose in said perforations. The rear ends of these rods or slats drag upon the ground, and the hay when cut by the sickle falls upon these rods. The stubble that remains standing on the ground forces the hay back until it is caught by the bunching-box 4, which rests on the top of and near the rear ends of said rods, and thus holds the hay. The front side of said bunching-box is open. The ends of the rods are turned up somewhat, and each alternate rod is about three inches, more or less, shorter than the longer ones. The long rods are about four and one-half feet, more or less, long and the short ones about four feet three inches, more or less, long.

Secured to and rising from the upper face of each end of the bar 1 are perforated bearings 5, and the bunching-box 4, that holds the hay, has extending forward from each of its ends a hinge-bearing 6, and by means of said hinge-bearing 6 said box is pivoted to the said bearings 5. The said bar 1 is fastened under the sickle-bar 7, as shown in Fig. 1. The grain-board 8 is taken off and the bar 1 is fastened underneath and slightly to the rear of said sickle-bar by three perforated short bars 9 and bolts 10. The said bunching-box 4 is controlled by a rod 11, the lower end of which is hinged to the rear wall of said bunching-box and its upper end to the longer and free end 12 of a U-shaped lever-rod 13. The base 14 of said lever-rod is hinged in an eye on the rear end of a plate 15, which is secured on the upper face and rear end of the tongue 16 of the mowing-machine. The short lever end 17 of said U-shaped rod stands at right angles in position to the long end of said U-shaped rod. Near the front end of said plate 16 is secured a bearing 18, in which is hinged a foot-lever 19. Hinged to the free end of the short arm 17 of the U-shaped rod 13 is the rear end of a rod 20, the front end of which is hinged to the foot-lever 19.

The operation of our invention is apparent, but may be briefly described as follows: The bunching-box 4, resting upon the trailing rods 3, receives the hay which is cut by the sickle and holds it, and when enough accumulates upon the rods to make a bunch the driver presses upon the foot-lever 19, which operation presses the lever 17 back, which operation throws the free end 12 of the lever 13 up, and consequently elevates lever 11 and the bunching-box 4, and consequently the stubble sweeps the hay off of the rods in bunches and windrows as desired. The box is then allowed to immediately drop back upon the rods, and the operation is duplicated.

Having described our invention, what we claim as new, and desire to secure by Letters Patent, is—

A bunching or windrowing device attached to a mowing-machine, consisting of a perforated plate 1, secured under the sickle-bar of the machine; rods, their front ends hinged in said perforations, their rear ends adapted to trail on the ground; a bunching-box having its front side hinged to said plate and its rear side resting on the rear ends of said rods and adapted to catch the hay cut by the machine; a plate secured to the rear end of the tongue of the machine; a foot-lever hinged to the front end of said plate; a U-shaped lever hinged to the rear end of said plate, one end of said U-shaped lever connected to said foot-lever by a rod, its other end to the rear wall of said bunching-box by a rod, said last-mentioned parts so arranged that when the foot-lever is pressed back, the rear part of said bunching-box, is raised, substantially as shown and described and for the purposes set forth.

In testimony whereof we affix our signatures in presence of two witnesses.

HARFORD F. HARRAH.
WILLIAM S. FLINT.

Witnesses:
E. D. BOYD,
I. BOYD.